(12) United States Patent
Correc

(10) Patent No.: US 11,073,002 B2
(45) Date of Patent: Jul. 27, 2021

(54) SUBSEA MANIFOLDS

(71) Applicant: Acergy France SAS, Suresnes (FR)

(72) Inventor: Morgan Correc, Paris (FR)

(73) Assignee: Acergy France SAS, Suresnes (FR)

( * ) Notice: Subject to any disclaimer, the term of this patent is extended or adjusted under 35 U.S.C. 154(b) by 0 days.

(21) Appl. No.: 16/627,931

(22) PCT Filed: Jul. 3, 2018

(86) PCT No.: PCT/IB2018/000819
§ 371 (c)(1),
(2) Date: Dec. 31, 2019

(87) PCT Pub. No.: WO2019/008435
PCT Pub. Date: Jan. 10, 2019

(65) Prior Publication Data
US 2020/0392817 A1 Dec. 17, 2020

(30) Foreign Application Priority Data
Jul. 4, 2017 (GB) ...................................... 1710766

(51) Int. Cl.
*E21B 43/017* (2006.01)
*F16L 41/03* (2006.01)

(52) U.S. Cl.
CPC ............ *E21B 43/017* (2013.01); *F16L 41/03* (2013.01)

(58) Field of Classification Search
CPC ................................ E21B 43/017; F16L 41/03
See application file for complete search history.

(56) References Cited

U.S. PATENT DOCUMENTS

| 3,562,014 | A |   | 2/1971 | Childers |            |
|-----------|---|---|--------|----------|------------|
| 4,874,008 | A | * | 10/1989 | Lawson  | E21B 34/04 |
|           |   |   |        |          | 137/315.09 |
| 5,275,510 | A | * | 1/1994 | de Baan  | F16L 1/16  |
|           |   |   |        |          | 405/168.1  |

(Continued)

FOREIGN PATENT DOCUMENTS

| GB | 2 281 925 | 3/1995 |
| GB | 2549102   | 10/2017 |

(Continued)

OTHER PUBLICATIONS

ANSI/API Specification 17J, "Specification for Unbonded Flexible Pipe," 3d ed. 2008.

(Continued)

*Primary Examiner* — Aaron L Lembo
(74) *Attorney, Agent, or Firm* — Levy & Grandinetti

(57) ABSTRACT

A subsea manifold layout interconnects subsea pipelines that extend beside each other to convey hydrocarbon production fluids in use. Each of the pipelines has an in-line manifold portion that is apt to be installed with the pipeline as an in-line accessory structure lowered with the pipeline from the surface, for example using S-lay, J-lay or reel-lay techniques. Thus, the in-line manifold portions of the respective pipelines are structurally separate from each other. Bridging pipes complete a subsea manifold structure having two or more of the in-line manifold portions, providing for production fluids to flow between the pipelines via the manifold portions of the respective pipelines.

28 Claims, 6 Drawing Sheets

(56) References Cited

U.S. PATENT DOCUMENTS

| | | | | |
|---|---|---|---|---|
| 5,437,302 | A * | 8/1995 | Da Silva | E21B 33/076 137/242 |
| 6,082,391 | A * | 7/2000 | Thiebaud | B63B 21/27 137/236.1 |
| 6,213,215 | B1 * | 4/2001 | Breivik | E21B 7/128 166/350 |
| 6,536,461 | B2 * | 3/2003 | Decker | F16L 55/46 137/268 |
| 7,793,724 | B2 | 9/2010 | Daniel et al. | |
| 8,430,168 | B2 * | 4/2013 | Goodall | F16L 1/26 166/336 |
| 8,919,449 | B2 | 12/2014 | Gonzalez et al. | |
| 8,950,498 | B2 * | 2/2015 | Parsinejad | E21B 43/01 166/344 |
| 10,663,085 | B2 * | 5/2020 | Pinho | F16L 55/46 |
| 10,947,822 | B2 * | 3/2021 | Gomes Martins | E21B 41/0007 |
| 2004/0149445 | A1 * | 8/2004 | Appleford | E21B 43/01 166/357 |
| 2005/0145388 | A1 * | 7/2005 | Hopper | E21B 43/36 166/357 |
| 2006/0144595 | A1 * | 7/2006 | Milligan | E21B 41/02 166/305.1 |
| 2019/0277116 | A1 * | 9/2019 | Halvorsen | E21B 36/00 |
| 2020/0332628 | A1 * | 10/2020 | de Araujo Bernardo | E21B 41/00 |
| 2021/0010352 | A1 * | 1/2021 | Stokke | E21B 43/013 |
| 2021/0025264 | A1 * | 1/2021 | Shirani | E21B 43/013 |

FOREIGN PATENT DOCUMENTS

| | | |
|---|---|---|
| WO | WO 2011/110950 | 9/2011 |
| WO | WO 2011/117607 | 9/2011 |
| WO | WO 2012/101525 | 8/2012 |
| WO | WO 2014/135849 | 9/2014 |
| WO | WO 2014/207560 | 12/2014 |
| WO | WO 2016/099291 | 6/2016 |

OTHER PUBLICATIONS

API Specification 5L, "Specification for Line Pipe," 45th ed. 2012.
API Recommended Practice 17B, "Recommended Practice for Flexible Pipe," 5th ed. 2014.
API Recommended Practice 1111, "Design, Construction, Operation, and Maintenance of Offshore Hydrocarbon Pipelines (Limit State Design)," 5th ed. 2015.

\* cited by examiner

SUBSEA MANIFOLDS

This invention relates to manifolds for use in the subsea oil and gas industry, for example to connect multiple wells to subsea pipelines. The invention also relates to methods for installing such manifolds at a subsea location, particularly on the seabed.

By way of example, FIGS. 1 and 2 illustrate a common subsea manifold layout 10 as known in the prior art. This includes a production loop comprising an in-line manifold 12 that lies on the seabed 14 close to multiple subsea wells surmounted by respective wellheads 16. There are four wells in this example, although there could be more or fewer wells.

In this example, two parallel pipelines 18 extend through and incorporate the manifold 12. More specifically, as shown in FIG. 2, the manifold 12 defines two interconnected main header legs 20. The arrangement is such that each pipeline 18 comprises one of the header legs 20, interposed between two rigid pipeline sections 22 as shown in FIG. 1. Piping and valve arrangements connect well branches 24 to both of the header legs 20, which allows each well to produce, selectively, via either or both of the pipelines 18 incorporating the header legs 20.

As best appreciated in the system diagram of FIG. 2, each well branch 24 comprises a respective one of the wellheads 16, which is connected to the manifold 12 by a respective well branch jumper pipe 26. The flow of production fluids from the wellhead 16 to the manifold 12 through each of those jumper pipes 26 is controlled by a respective control valve 28. The control valves 28 can be operated individually and selectively to permit or to shut down the flow of production fluids from any of the well branches 24 into the manifold 12.

In the manifold 12, the output from each well branch 24 is divided into two sub-branches 30. Each sub-branch 30 communicates with a respective one of the header legs 20 via a respective distribution valve 32. The distribution valves 32 can be operated individually and selectively to permit or to shut down the flow of production fluids from any of the well branches 24 into either or both of the header legs 20.

Each end of each header leg 20 is connected to a respective pipeline section 22 via a respective in-line jumper pipe 34. Thus, each header leg 20 is connected between, and in series with, a respective pair of pipeline sections 22 to effect fluid communication between them. The flow of production fluids through each header leg 20 is controlled by a respective header valve 36 in series with each associated pair of pipeline sections 22. Thus, the header valves 36 can be operated individually and selectively to permit or to shut down the flow of production fluids in either or both of the pipelines 18.

In this example, each pipeline section 22 terminates in a pipeline end terminal (PLET) 38. Each PLET 38 is connected by one of the in-line jumper pipes 34 to a respective end of a header leg 20.

This common architecture has various benefits in terms of maintenance and operability. For example, if wells served by the manifold 12 have significantly different pressures, the availability of two main header legs 20 allows one header leg 20 to be dedicated to relatively low-pressure wells and the other header leg 20 to be dedicated to higher-pressure wells. This helps to optimise production. Also, the output of each well can be tested individually by directing production fluids from the well being tested to flow in one header leg 20 while directing production fluids from other wells to flow in the other header leg 20.

Various other modes of operation are possible. For example, it will be apparent that with appropriate operation of the header valves 36 and the distribution valves 32, a flow of production fluids can be diverted from one pipeline 18, through the manifold 12 and into the other pipeline 18.

Where valves are closed, clogging of the production loop can be mitigated by holding an appropriate fluid such as diesel oil in the loop. Also, a pigging loop (not shown) may be provided for cleaning and inspection.

A drawback of a typical manifold 12 as illustrated in FIGS. 1 and 2 is that it is a large and heavy structure that may weigh more than 500 tonnes in air. Such a manifold 12 must therefore be lowered to the seabed in a dedicated installation operation using a heavy-lift vessel. The manifold must also be supported upon a substantial pre-installed foundation, exemplified here by one or more piles 40. For example, suction piles may be used in a soft seabed or pin piles may be used in a rocky seabed. Installation of the foundation and subsequent installation of the manifold 12 on top of the foundation are expensive and challenging operations that tie up expensive installation vessels and that require lengthy windows of sufficiently calm weather.

In this example, installation operations are further complicated by the need to install four pipeline sections 22, each fitted with a respective PLET 38. Even if the PLETs 38 are installed with the pipeline 18 as pre-attached accessories, it is necessary to perform four pipeline initiation operations and four pipeline abandonment operations in succession and in close proximity to each other. Of course, if the PLETs 38 are instead installed separately, four additional lowering and subsea connection operations would be necessary too.

In any event, four in-line jumper pipes 34 have to be designed, made, tested and transported to site before being lowered to the seabed and connected to the PLETs 38 and the manifold 12. In this respect, the internal diameter of the in-line jumper pipes 34 must be large enough to handle the maximum aggregate flowrate of production fluids flowing from all wells upstream. Thus, the in-line jumper pipes 34 may need to have substantially the same internal diameter as the main pipeline sections 22. This makes in-line jumper pipes 34 expensive to make and challenging to transport.

Various prior art disclosures address the challenges presented by subsea structures that are too large for installation in a single operation. In WO 2016/099291, for example, a 'mother' pipeline end manifold, located between a pipeline termination and a riser, gathers together the key functions of a centralised hub. The 'mother' manifold is extended in modular fashion by smaller, 'extension' structures located near to secondary wellheads. However, the 'mother' manifold remains a large and heavy structure that is challenging to install. Nor does it address the problem of effecting manifold connections between parallel flowlines as shown in FIGS. 1 and 2. Instead, the 'extension' structures are all connected to the same manifold.

U.S. Pat. No. 7,793,724 discloses a unique manifold, used as a drill centre, to connect two parallel lines. A U-shaped pigging loop, mounted on the manifold, joins the ends of the two lines to connect the lines for fluid communication between them. U.S. Pat. No. 8,919,449 discloses another type of drill centre manifold. In that case, a main hub does not connect together multiple lines but instead gathers oil flowing from several wellheads through jumper pipes.

GB2549102 discloses a pipeline integrated manifold (PLIM) having a conduit defining opposed ports to enable the PLIM to be installed within a pipeline. The PLIM further includes a pair of hub connectors for receiving a flow of hydrocarbons from respective trees. Electrical connections are also provided, so that the PLIM is a compact, self-contained structure. GB2549102 is therefore similar to the arrangement described above with respect to FIG. 1, albeit simpler as the PLIM only provides connections to a single pipeline.

Against this background, the invention provides a subsea manifold system or layout interconnecting first and second subsea production pipelines that extend beside each other to convey hydrocarbon production fluids in use. Each of the first and second pipelines has at least one manifold portion disposed in line, the in-line manifold portions of the respective pipelines being structurally separate from each other. At least one bridging pipe is in fluid communication with the in-line manifold portions of the respective pipelines to provide for flow of production fluids between those pipelines.

At least two bridging pipes may be in fluid communication with the in-line manifold portions of the respective pipelines. A first of those bridging pipes may provide for flow of production fluid from the first pipeline to the second pipeline and a second of those bridging pipes may provide for flow of production fluids from the second pipeline to the first pipeline.

Advantageously, when connected by the bridging pipe or pipes, the in-line manifold portions together constitute a complete subsea manifold.

The in-line manifold portions may be connected directly to adjoining sections of the respective pipelines. For example, each in-line manifold portion may comprise an in-line pipeline section having end interfaces for end-to-end coupling with respective adjoining pipeline sections.

At least one of the in-line manifold portions suitably comprises at least one bridging pipe interface for connection to the or each bridging pipe; and at least one additional fluid inlet for receiving an incoming flow of production fluids. In that case, the or each additional fluid inlet may be in fluid communication with a respective subsea wellhead via a respective well branch.

There may be first and second branch sections downstream of the or each additional fluid inlet, the first branch section communicating with the first pipeline in which the manifold portion is disposed in line, and the second branch section communicating with an in-line manifold portion of the second pipeline via the at least one bridging pipe.

The first and second branch sections may each comprise a respective distribution valve. A control valve may be disposed upstream of the first and second branch sections.

Each of the in-line manifold portions suitably comprises a header valve arranged to control flow of production fluids in the respective pipelines.

The or each bridging pipe is preferably less than 100 m long. Similarly, in-line manifold portions of the respective pipelines in fluid communication with each other are preferably less than 100 m apart.

The in-line manifold portions may have respective separate foundations. For example, at least one of the in-line manifold portions may comprise a mudmat foundation, which may conveniently be attached to the in-line manifold portion at a surface location.

The inventive concept embraces a manifold portion for use in interconnecting first and second subsea production pipelines that convey hydrocarbon production fluids in use. The manifold portion of the invention comprises: an in-line pipeline section having end interfaces for coupling with respective adjoining pipeline sections; at least one bridging pipe interface for connection to a bridging pipe; and at least one additional fluid inlet for receiving an incoming flow of production fluid.

The manifold portion may further comprise: a first bridging pipe interface being an outlet in fluid communication with a first branch section downstream of the additional fluid inlet; and a second bridging pipe interface being an inlet in fluid communication with the in-line pipeline section. The in-line pipeline section is suitably also in fluid communication with a second branch section downstream of the additional fluid inlet.

The inventive concept also extends to the related method of constructing a subsea manifold layout, the method comprising: installing a first subsea production pipeline that incorporates a first in-line manifold portion; installing a second subsea production pipeline that incorporates a second in-line manifold portion; and after installation, coupling the in-line manifold portions to each other to provide for flow of production fluids between the installed first and second pipelines.

The method of the invention may further comprise coupling the installed in-line manifold portions to other sources of production fluids, for example to subsea wellheads.

Advantageously, the manifold portions may be incorporated into the respective pipelines at a surface location and may then be lowered with the respective pipelines to a subsea location. For example, the manifold portions may be incorporated into the respective pipelines as pipeline accessories for installation by S-lay, J-lay or reel-lay operations. In that case, the in-line manifold portions are suitably welded to adjoining sections of the respective pipelines.

In the first in-line manifold portion, an incoming flow of production fluids is suitably divided into first and second branch sections, the first branch section communicating with the first pipeline and the second branch section communicating with the second pipeline. For example, the second branch section may communicate with the second pipeline via the second in-line manifold portion. Distribution valves in the first and second branch sections may be operated to direct the incoming flow to the first pipeline and/or to the second pipeline.

In summary, the invention involves replacing a unique manifold with two or more integrated in-line structures or pipeline accessories that, after installation, are bridged together for fluid communication between them. Such structures may therefore be regarded as in-line manifold structures or manifold portions.

The invention may, for example, be used where there are at least two pipelines, each comprising two separate line sections. Each of the in-line structures accommodates one pipeline comprising one line section on each side or end of the structure.

As these smaller structures are in-line, they are intrinsically smaller and lighter than known manifold structures and so can be installed with the pipeline using methods known in the art. Each in-line structure suitably has its own individual foundation. For example, WO 2014/207560 shows how to install a small in-line structure by separating a flowline part from a foundation part.

Thus, the invention replaces an in-line manifold with in-line gathering structures and associated cross-over jumpers. By doing so, the invention enables a substantial gain in terms of the time and cost of fabrication, planning and installation. Yet, the invention maintains the benefits of the prior art architecture having an in-line two-header manifold, as shown in FIGS. 1 and 2 of the drawings.

The same principle, with different piping and instrumentation, would be applicable to termination manifolds such as those that end a pigging loop.

Embodiments of the invention provide a fluid connection structure for interconnecting at least two pipelines. The structure comprises: at least one in-line structure per pipeline; and at least one bridging jumper between each pair of in-line structures. There may be at least two bridging jumpers for each pair of in-line structures, one for each direction of flow.

A bridging jumper is preferably less than 100 m long and more preferably less than 50 m long. In other words, the distance between two in-line structures of one pair is preferably less than 100 m and more preferably less than 50 m.

A bridging jumper or other spool or jumper pipe used in the invention may be of rigid, composite or flexible pipe.

In the context of subsea pipes, 'rigid', 'composite' and 'flexible' have the particular meanings understood by those skilled in the art, namely technicians in the subsea oil and gas industry. Thus, nominally 'rigid' pipes have enough flexibility to be bent along their length if a sufficient minimum bend radius (MBR) is observed. Yet, such pipes are not regarded in the industry as being 'flexible' pipes. 'Composite' pipes are regarded in the industry as being distinct from both rigid pipes and flexible pipes but they have more in common with rigid pipes, albeit permitting a greater range of elastic bending strain than similarly-sized rigid pipes.

Examples of rigid pipes used in the subsea oil and gas industry are specified in the American Petroleum Institute (API) Specification 5L and Recommended Practice 1111. A rigid pipe usually consists of or comprises at least one solid steel pipe. Additional components can be added to form a composite structure, such as an internal liner layer or an outer coating layer. Such additional components can comprise polymer, metal or composite materials.

Flexible unbonded pipes used in the subsea oil and gas industry are specified in API Specification 17J and Recommended Practice 17B. The flexible pipe body is composed of a composite sandwich-wall structure of layered materials, in which each layer has its own function. Typically, polymer tubes and wraps ensure fluid-tightness and thermal insulation. Conversely, steel layers or other elements provide mechanical strength to resist tensile loads and hydrostatic pressure; for example, interlocked steel tapes form a carcass or pressure vault and a tensile armour is formed of helically-wound wire. Flexible pipes are typically manufactured continuously to the desired length between steel end fittings.

Composite pipes are pipes whose structural strength, in terms of resistance to bending along their length, is derived wholly, substantially or predominantly from one or more composite materials, as distinct from composite structures. Typically, composite pipes comprise layers of angled polymer wraps. WO 2011/117607 discloses an example of a polymer composite pipe based on PEEK (polyetheretherketone). Again, steel end fixings are typically used.

In the context of the invention, 'in-line' means that the structure is substantially remote from a pipeline end. For example, the distance between the structure and the closest end of the pipeline is preferably greater than 100 m.

The invention also resides in a method for interconnecting at least two distinct pipelines. The method comprises: installing the at least two pipelines, each with at least one inline connection structure; and installing at least one bridging jumper between each pair of in-line structures for fluidly connecting the pipelines together.

Thus, the invention provides a subsea manifold layout that interconnects subsea production pipelines. Each of the pipelines has an in-line manifold portion that is apt to be installed with the pipeline as an in-line accessory structure lowered with the pipeline from the surface, for example using S-lay, J-lay or reel-lay techniques. Thus, the in-line manifold portions of the respective pipelines are structurally separate from each other. Bridging pipes complete a subsea manifold structure comprising two or more of the in-line manifold portions, providing for production fluids to flow between the pipelines via the manifold portions of the respective pipelines.

To illustrate the prior art, reference has already been made to FIGS. 1 and 2 of the drawings, where:

FIG. 1 is a perspective view of a subsea manifold arrangement as known in the prior art; and FIG. 2 is a schematic system diagram corresponding to FIG. 1.

In order that the invention may be more readily understood, reference will now be made, by way of example, to the remainder of the accompanying drawings, in which.

Figure 6:
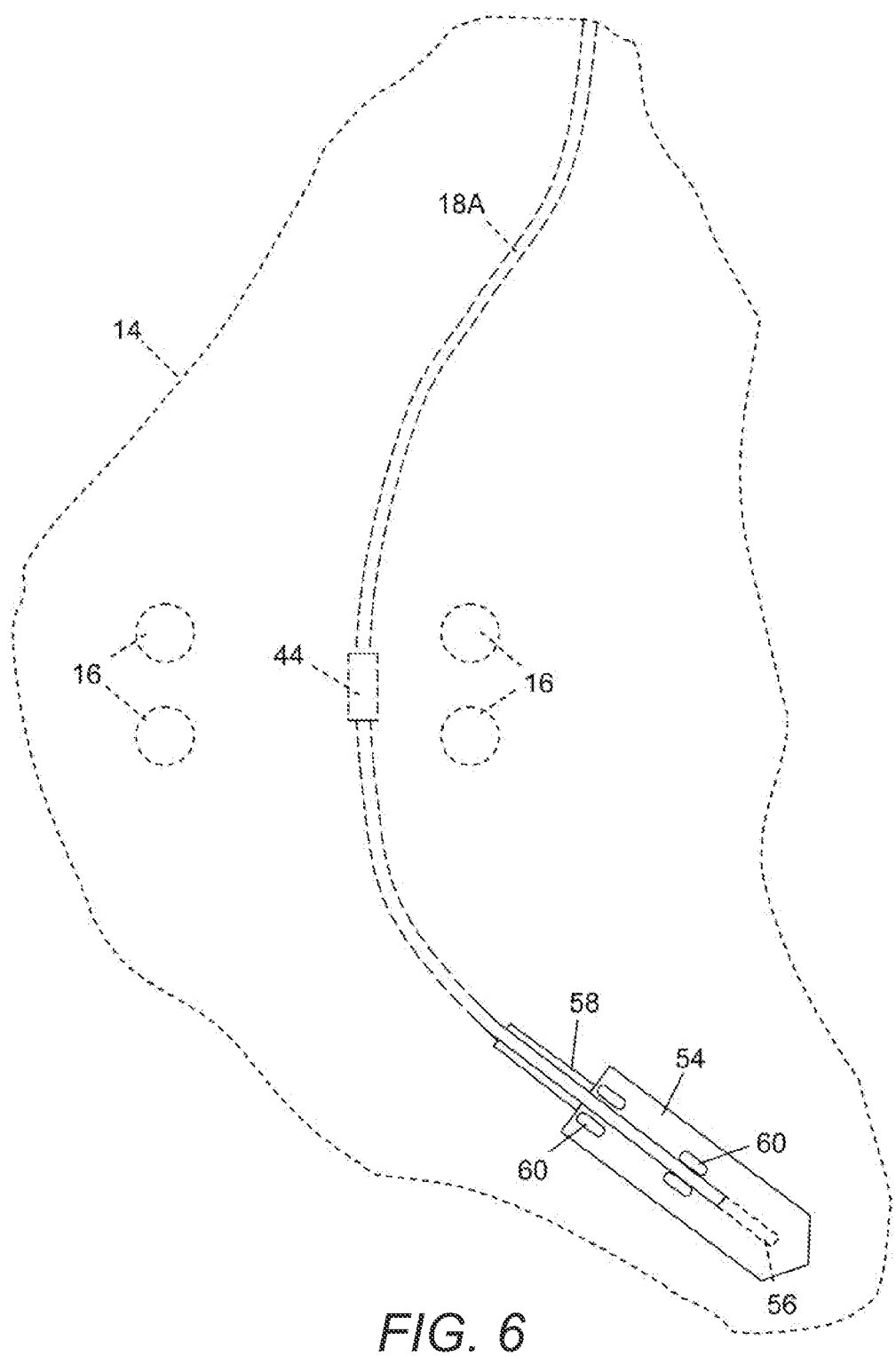
Figure 7:
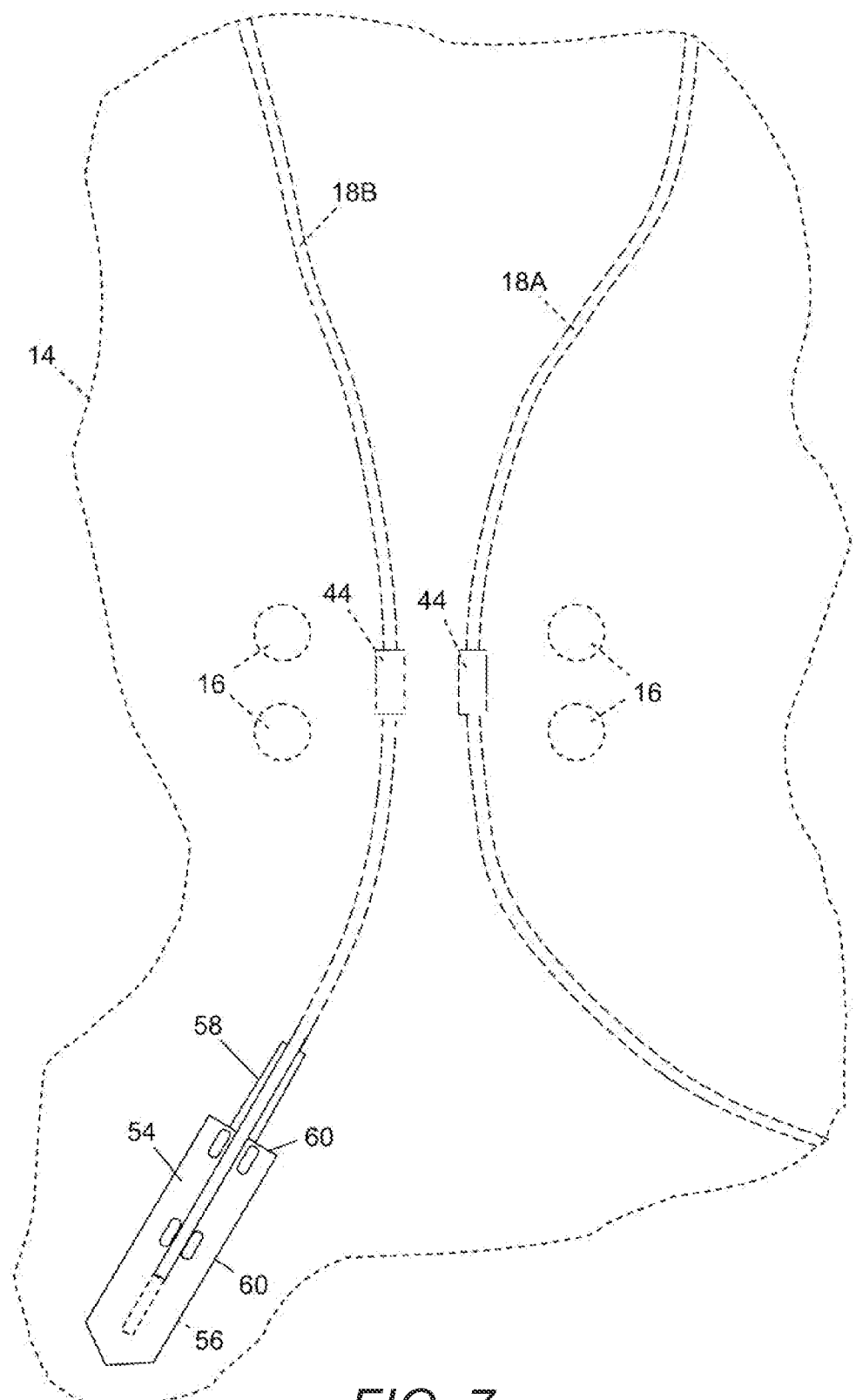
Figure 8:
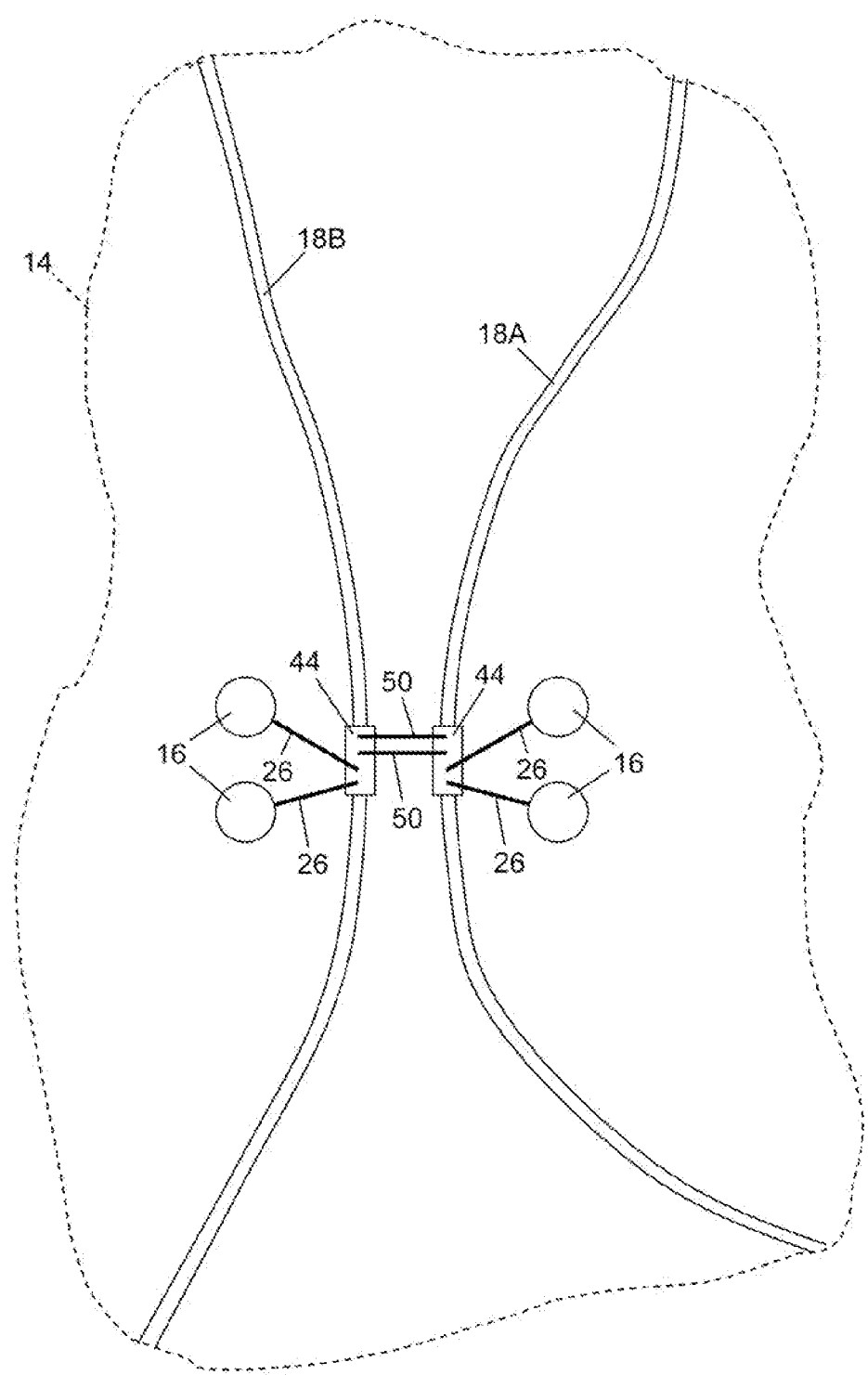

FIG. 7 corresponds to FIG. 6 but shows an installation vessel laying a second pipeline on the seabed beside the first pipeline, the second pipeline also comprising an in-line manifold structure of the invention laid adjacent to the in-line manifold structure of the first pipeline; and FIG. 8 corresponds to FIG. 7 but is from above the seabed and shows jumper pipes now connecting the in-line manifold structures of the first and second pipelines to each other and to the adjacent subsea wells.

Figure 3:
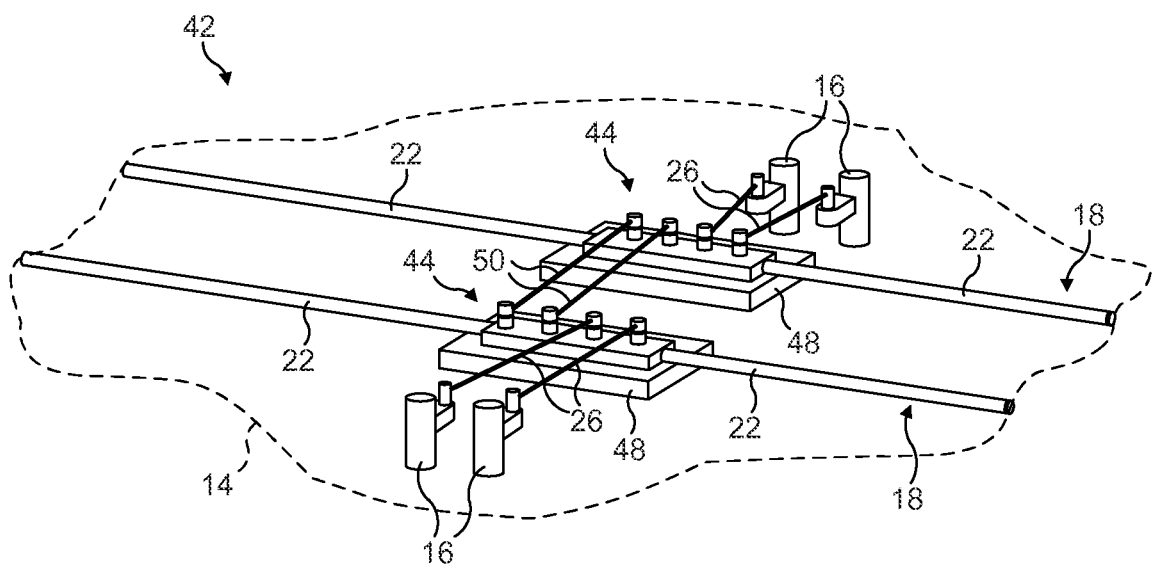
FIG. 3 is a perspective view of a subsea manifold arrangement in accordance with the invention.
Figure 4:
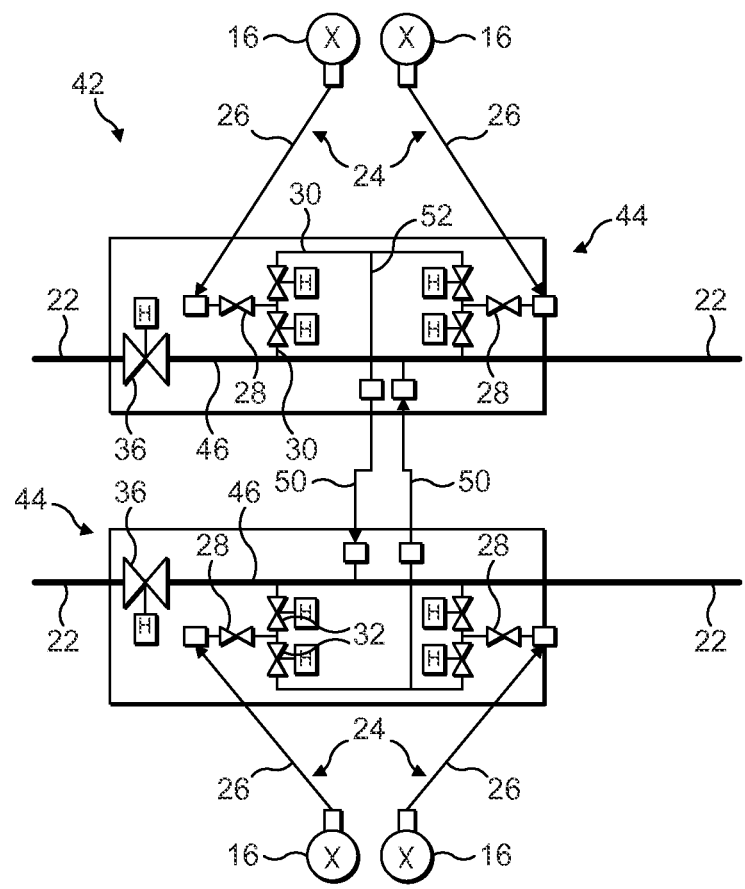
FIG. 4 is a schematic system diagram corresponding to FIG. 3.

Referring next, then, to FIGS. 3 and 4 of the drawings, these drawings show a subsea manifold layout 42 in accordance with the invention. Like numerals are used for like features.

There are again two generally parallel pipelines 18 and four subsea wellheads 16 in this example for ease of comparison. However, there could be more or fewer pipelines or wellheads in other embodiments of the invention. Similarly, although two wellheads 16 are shown to each respective side of the pipelines 18, the wellheads could be distributed differently.

Figure 1:
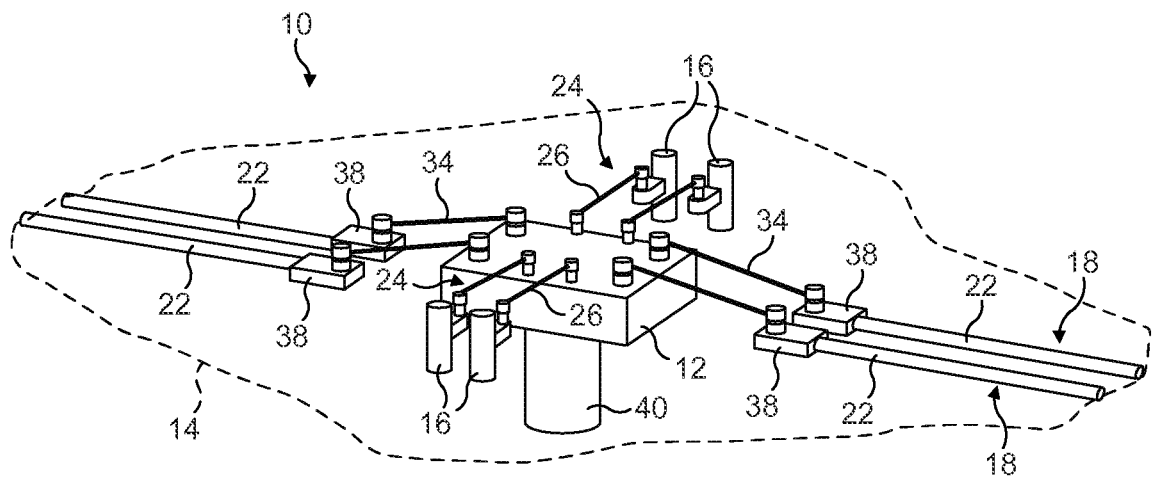
Figure 2:
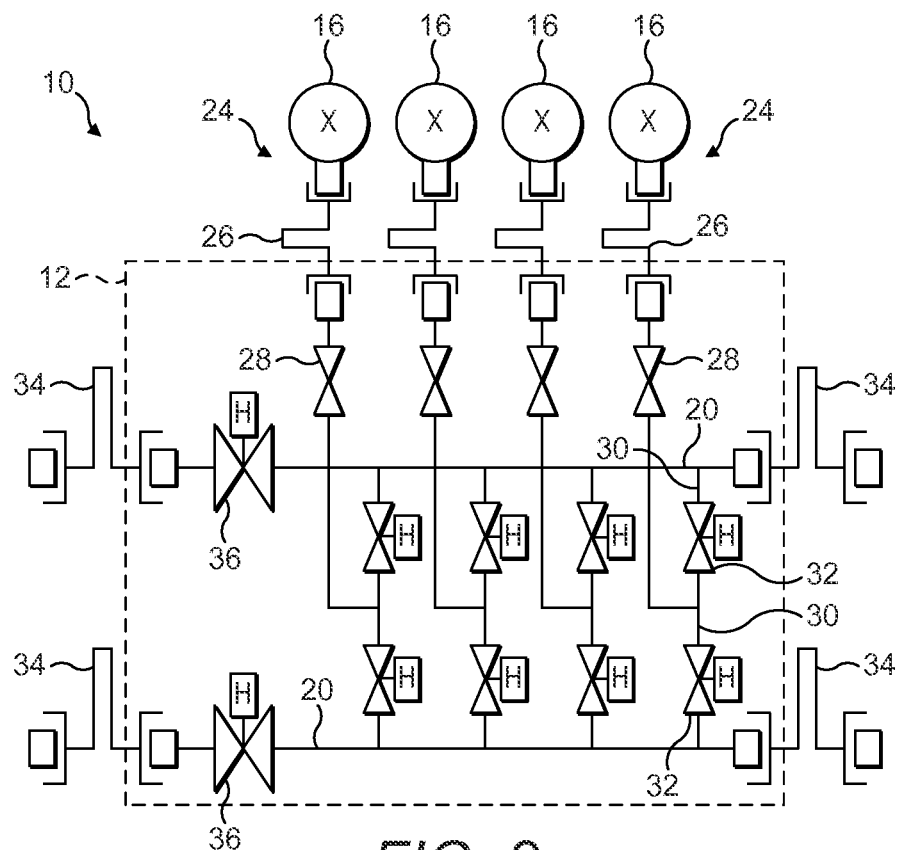

Each pipeline 18 comprises an in-line manifold structure 44 that implements the function of a respective one of the main header legs 20 of the prior art manifold 12 shown in FIGS. 1 and 2. Similarly, each in-line manifold structure 44 is interposed between two rigid pipeline sections 22 to effect fluid communication along the pipeline 18. However in this case, the pipeline sections 22 are typically attached directly to the in-line manifold structure 44.

For this purpose, the pipeline sections 22 may be welded or otherwise attached to respective ends of a length of flowline pipe that forms part of each in-line manifold structure 44. Specifically, as shown in the system diagram of FIG. 4, each in-line manifold structure 44 comprises an in-line pipe section 46 to which sections 22 of the associated pipeline 18 are welded. Each of those in-line pipe sections 46 performs the function of a header leg 20 shown in FIGS. 1 and 2.

An advantage of the invention is that each of the in-line manifold structures 44 may be compact and light enough to be supported by mudmat foundations 48 as shown in FIG. 3 rather than the pile foundations that are typical of the prior art.

Piping and valve arrangements enable fluid communication between any of the wellheads 16 and both of the in-line manifold structures 44, like the header legs 20 of the prior art. The flow of production fluids through each in-line pipe section 46 is controlled by a respective header valve 36. Thus, as before, the header valves 36 can be operated individually and selectively to permit or to shut down the flow of production fluids in either or both of the pipelines 18.

As in FIGS. 1 and 2, the piping and valve arrangements of FIGS. 3 and 4 allow each well to produce, selectively, via either or both of the pipelines 18 that incorporate the in-line manifold structures 44. However, the piping and valve arrangements shown in FIGS. 3 and 4 differ to suit the use of parallel in-line manifold structures 44 in accordance with the invention. For example, after installation of the pipelines 18 with their respective in-line manifold structures 44, spool or jumper pipes 50 are connected between the in-line manifold structures 44 to couple them for fluid communication between them. This will be explained in more detail later with reference to FIGS. 5 to 8 of the drawings.

As best appreciated in FIG. 4, each well branch 24 again comprises a wellhead 16 that is connected to one or other of the in-line manifold structures 44 by a respective well branch spool or jumper pipe 26. Similarly, the flow of production fluids from the wellhead 16 through each of those jumper pipes 26 to the associated in-line manifold structure 44 is controlled by a respective control valve 28. As before, the control valves 28 can be operated individually and selectively to permit or to shut down the flow of production fluids from any of the well branches 24 that are connected directly to each in-line manifold structure 44.

In each in-line manifold structure 44, the output of production fluids from each well branch 24 is divided into two sub-branches 30. The flow of production fluids through each sub-branch 30 is controlled by a respective distribution valve 32. By operating the distribution valves 32 individually and selectively, the flow of production fluids from any of the well branches 24 into either or both of the in-line pipe sections 46 can be enabled or shut down.

One sub-branch 30 associated with each well branch 24 communicates directly with the in-line pipe section 46 of the in-line manifold structure 44 also associated with that well branch 24. The other sub-branch 30 associated with that well branch 24 communicates indirectly with the in-line pipe section 46 of the other in-line manifold structure 44. The indirect communication with that other in-line pipe section 46 is effected through a bridging jumper pipe 50 that bridges the gap between the in-line manifold structures 44.

Each bridging pipe 50 handles a flow of production fluids in a respective opposed direction. Thus, two such bridging pipes 50 enable production fluids to flow in opposite directions between the in-line manifold structures 44, as determined by the settings of the various control valves 28 and distribution valves 32.

To allow a single bridging pipe 50 to accept production fluids flowing from two or more well branches 24, the output from the appropriate sub-branches 30 is merged in an output manifold 52 upstream of the bridging pipe 50.

Figure 5:
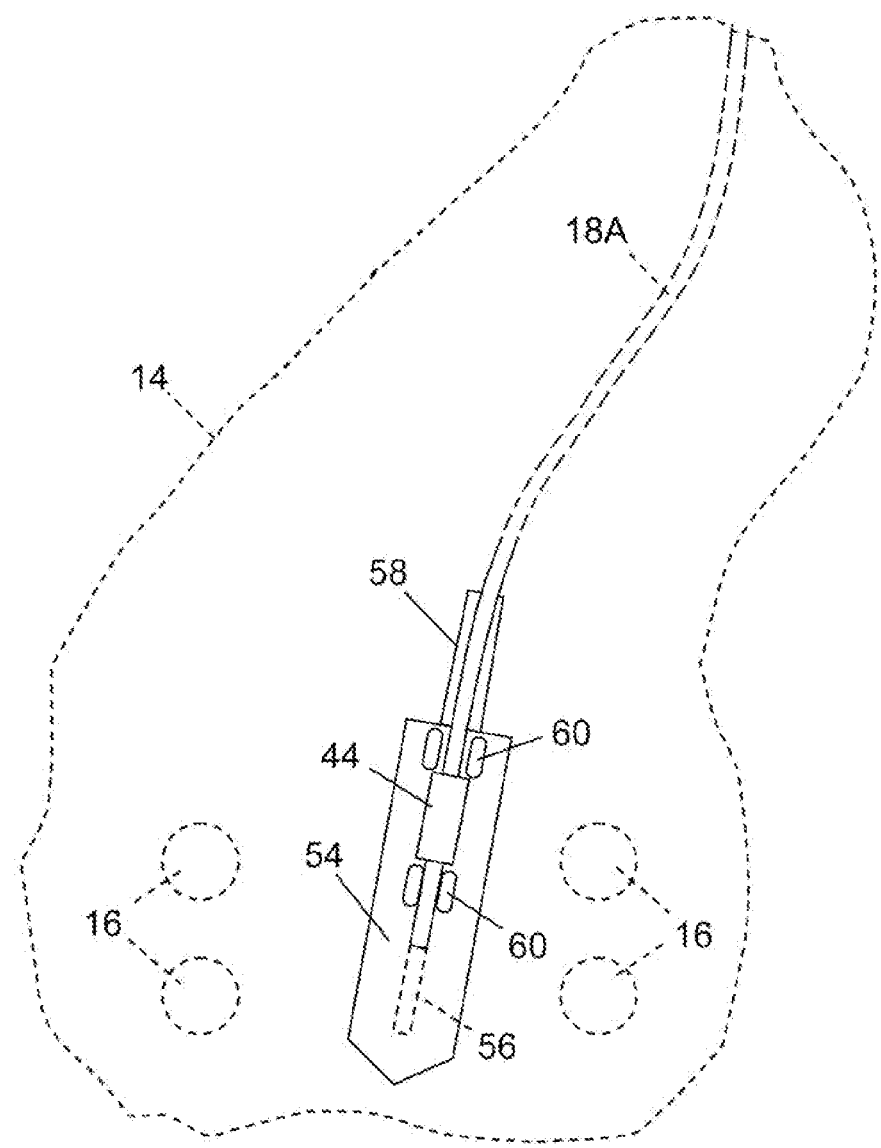
FIGS. 5 and 6 are schematic sequential top plan views from above the surface showing a first pipeline being laid by an installation vessel on the seabed adjacent to a group of subsea wells, the pipeline comprising an in-line manifold structure in accordance with the invention.

Turning next to FIGS. 5 and 6 of the drawings, which are much-simplified and not to scale, these show an installation vessel 54 fabricating and laying a first pipeline 18A on the seabed 14 adjacent to a group of subsea wellheads 16. The first pipeline 18A comprises an in-line manifold structure 44 in accordance with the invention.

Marine pipelaying that involves fabricating a rigid pipeline on an installation vessel is generally performed in the art by either S-lay or J-lay techniques. It is also possible to lay a rigid pipeline by a reel-lay technique. In that case, the pipeline is fabricated and spooled onto a reel of an installation vessel at an onshore spoolbase or yard and is then unspooled and straightened during installation offshore.

In this example, the installation vessel 54 is configured for S-lay operations although other installation operations such as J-lay or reel-lay could be used instead. In each case, an in-line manifold structure 44 may be incorporated into the pipeline 18A using techniques well known for other pipeline accessories, such as in-line tee assemblies.

S-lay involves welding together successive pipe sections or pipe joints 56 at a series of working stations in a generally horizontal firing line on a working deck of the installation vessel 54. The pipeline 18A is launched from the vessel 54 into the water over a stinger 58 that trails from the vessel 54. A series of tensioners 60 grip the pipeline 18A to control its movement relative to the vessel 54 under the tensile load of the free span of the pipeline 18A extending between the vessel 54 and the seabed 14.

FIG. 5 shows the in-line manifold structure 44 still supported on the working deck of the installation vessel 54, having just been incorporated into the first pipeline 18A by being welded to adjoining pipe joints 56 as part of a pipe string. Another pipe joint 56, shown here in dashed lines, is about to be welded to the upper end of the pipe string, upstream of the in-line manifold structure 44. Downstream of the in-line manifold structure 44, the pipeline 18A extends over the stinger 58, into the sea and down to the seabed 14 beneath and astern of the vessel 54. The submerged portion of the pipeline 18A is shown in dashed lines.

The installation vessel 54 may change course as necessary so that the first pipeline 18A will follow a desired path on the seabed 14 as shown. In this instance, that path takes the first pipeline 18A between the subsea wellheads 16 of the group.

FIG. 6 shows the installation vessel 54 having advanced beyond the group of subsea wellheads 16. The in-line manifold structure 44 has now been launched from the vessel 54 into the sea and lowered down to the seabed 14 as part of a laid portion of the first pipeline 18A. The installation vessel 54 then continues laying the first pipeline 18A on an appropriate path until the first pipeline 18A has been abandoned or terminated.

Thus, the in-line manifold structure 44 now lies on its mudmat foundation as shown in FIG. 3, at a location on the seabed adjacent to the subsea wellheads 16. Specifically, the in-line manifold structure 44 lies among the group of wellheads 16 in this example.

FIG. 7 corresponds to FIG. 6 but shows an installation vessel 54 similarly laying a second pipeline 18B on the seabed 14 beside the first pipeline 18A. The second pipeline 18B also comprises an in-line manifold structure 44 of the invention. Again, the vessel 54 is shown here having advanced beyond the group of subsea wellheads 16, with the in-line manifold structure 44 having been launched from the vessel 54 into the sea and lowered down to the seabed 14 as part of a laid portion of the second pipeline 18B. The installation vessel 54 then continues laying the second pipeline 18B on an appropriate path until the second pipeline 18B has also been abandoned or terminated.

Thus, the in-line manifold structure 44 of the second pipeline 18B now lies on its mudmat foundation 40 as shown in FIG. 3, at a location on the seabed adjacent to the in-line manifold structure 44 of the first pipeline 18A and also among the group of wellheads 16 in this example. The gap or spacing between the in-line manifold structures 44 parallel to the seabed 14 is preferably less than 100 m and more preferably less than 50 m.

Turning finally to FIG. 8, this shows jumper pipes 26, 50 now connecting the in-line manifold structures of the first and second pipelines to the adjacent subsea wells and to each other. Specifically, FIG. 8 shows the well branch jumper pipes 26 that connect each wellhead 16 to an associated in-line manifold structure 44 and the bridging jumper pipes 50 that interconnect and bridge the gap between the in-line manifold structures 44. Each of those pipes 26, 50 is apt to be lowered to the seabed using a crane or winch of a surface support vessel and to be positioned and connected subsea with the support of an ROV.

It will be noted that unlike the prior art arrangement shown in FIGS. 1 and 2, no PLETs or in-line jumper pipes are interposed between the adjacent sections 22 of the pipelines 18A, 18B and the associated in-line manifold structures 44. This reduces cost and eases installation, as the in-line manifold structures 44 can be installed together with their respective pipelines 18A, 18B after being incorporated into each pipeline 18A, 18B aboard an installation vessel 54 at the surface. So, the number of pipeline initiation and abandonment operations is minimised and there is no need to transport or install large-diameter in-line jumper pipes. Nor is there a need for a heavy-lift vessel that would otherwise be required to lower a single larger manifold to the seabed.

Many variations are possible within the inventive concept. For example, mudmats may be preinstalled on the seabed so that the in-line manifold structures are landed onto them, for example as disclosed in WO 2011/110950. Alternatively, mudmats may be installed after the in-line manifold structures have been landed on the seabed, for example as disclosed in WO 2014/207560.

Preferably, however, mudmats are installed with the in-line manifold structures, for example being attached to the in-line manifold structures aboard the installation vessel and launched with the associated pipeline into the sea as shown in FIGS. 5 to 8. In that case, mudmats could be launched from the vessel in a compact folded configuration and then deployed into an extended configuration before being landed on the seabed, as exemplified in WO 2012/101525 and WO 2014/135849. This is particularly useful where there is restricted space around the firing line of an S-lay installation vessel.

The invention claimed is:

1. A subsea manifold layout interconnects first and second subsea production pipelines that extend beside each other to convey hydrocarbon production fluids in use, wherein:
   each of the first and second pipelines has at least one manifold portion disposed in line, the in-line manifold portions of the respective pipelines being structurally separate from each other; and
   at least one bridging pipe is in fluid communication with the in-line manifold portions of the respective pipelines to provide for flow of production fluids between those pipelines.

2. The manifold layout of claim 1, comprising at least two bridging pipes in fluid communication with the in-line manifold portions of the respective pipelines, a first of those bridging pipes providing for flow of production fluid from the first pipeline to the second pipeline and a second of those bridging pipes providing for flow of production fluids from the second pipeline to the first pipeline.

3. The manifold layout of claim 1, wherein when connected by the bridging pipe or pipes, the in-line manifold portions together constitute a complete subsea manifold.

4. The manifold layout of claim 1, wherein the in-line manifold portions are connected directly to adjoining sections of the respective pipelines.

5. The manifold layout of claim 4, wherein each in-line manifold portion comprises an in-line pipeline section having end interfaces for end-to-end coupling with respective adjoining pipeline sections.

6. The manifold layout of claim 1, wherein at least one of the in-line manifold portions comprises at least one bridging pipe interface for connection to the or each bridging pipe; and at least one additional fluid inlet for receiving an incoming flow of production fluids.

7. The manifold layout of claim 6, wherein the or each additional fluid inlet is in fluid communication with a respective subsea wellhead via a respective well branch.

8. The manifold layout of claim 6, comprising first and second branch sections downstream of the or each additional fluid inlet, the first branch section communicating with the first pipeline in which the manifold portion is disposed in line, and the second branch section communicating with an in-line manifold portion of the second pipeline via the at least one bridging pipe.

9. The manifold layout of claim 8, wherein the first and second branch sections each comprise a respective distribution valve.

10. The manifold layout of claim 8, further comprising a control valve upstream of the first and second branch sections.

11. The manifold layout of claim 1, wherein each of the in-line manifold portions comprises a header valve arranged to control flow of production fluids in the respective pipelines.

12. The manifold layout of claim 1, wherein the or each bridging pipe is less than 100 m long.

13. The manifold layout of claim 1, wherein in-line manifold portions of the respective pipelines in fluid communication with each other are less than 100 m apart.

14. The manifold layout of claim 1, wherein the in-line manifold portions have respective separate foundations.

15. The manifold layout of claim 14, wherein at least one of the in-line manifold portions comprises a mudmat foundation.

16. A manifold portion for use in interconnecting first and second subsea production pipelines that convey hydrocarbon production fluids in use, the manifold portion comprising:
   an in-line pipeline section having end interfaces for coupling with respective adjoining pipeline sections;
   first and second bridging pipe interfaces for connection to respective bridging pipes, the first bridging pipe interface being an outlet and the second bridging pipe interface being an inlet in fluid communication with the in-line pipeline section; and
   first and second additional fluid inlets for receiving respective incoming flows of production fluid, each of the first and second fluid inlets being upstream of a respective pair of branch sections, wherein one branch section of each pair is in fluid communication with the in-line pipeline section and the other branch section of each pair is in fluid communication with the first bridging pipe interface.

17. A method of constructing a subsea manifold layout, the method comprising:

installing a first subsea production pipeline that incorporates a first in-line manifold portion;

installing a second subsea production pipeline that incorporates a second in-line manifold portion; and after installation, coupling the in-line manifold portions to each other to provide for flow of production fluids between the installed first and second pipelines.

18. The method of claim 17, further comprising coupling the installed in-line manifold portions to other sources of production fluids.

19. The method of claim 18, comprising coupling the in-line manifold portions to subsea wellheads.

20. The method of claim 17, comprising incorporating the manifold portions into the respective pipelines at a surface location and lowering the manifold portions with the respective pipelines to a subsea location.

21. The method of claim 20, comprising incorporating the manifold portions into the respective pipelines as pipeline accessories and installing the pipelines including the manifold portions by S-lay, J-lay or reel-lay operations.

22. The method of claim 21, comprising welding the in-line manifold portions to adjoining sections of the respective pipelines.

23. The method of claim 17, comprising supporting the first and second in-line manifold portions on individual subsea foundations.

24. The method of claim 23, comprising supporting the first and second in-line manifold portions on respective mudmats.

25. The method of claim 17, comprising laying the first and second in-line manifold portions at a seabed location less than 100 m apart.

26. The method of claim 17, comprising, in the first in-line manifold portion, dividing an incoming flow of production fluids into first and second branch sections, the first branch section communicating with the first pipeline and the second branch section communicating with the second pipeline.

27. The method of claim 26, wherein the second branch section communicates with the second pipeline via the second in-line manifold portion.

28. The method of claim 26, comprising operating distribution valves in the first and second branch sections to direct the incoming flow to the first pipeline and/or to the second pipeline.

* * * * *